Feb. 11, 1941.     D. E. AUSTIN     2,231,285
SWAY BAR
Filed April 9, 1940

Inventor
Dwight E. Austin
By Blackmore, Spencer & Hint
Attorneys

Patented Feb. 11, 1941

2,231,285

UNITED STATES PATENT OFFICE 2,231,285

SWAY BAR

Dwight E. Austin, Orchard Lake, Mich., assignor to General Motors Corporation, Detroit, Mich., a corporation of Delaware Application April 9, 1940, Serial No. 328,735

5 Claims. (Cl. 267—11)

This invention relates to vehicles and has particular reference to means for stabilizing the vehicle to prevent rolling or side sway, and for shock absorbing or snubbing the vehicle spring action.

The essential novelty to the invention resides in the provision of a rubber connection between the arms of the stabilizing bar and the frame of the vehicle.

On the drawing

Figure 1:
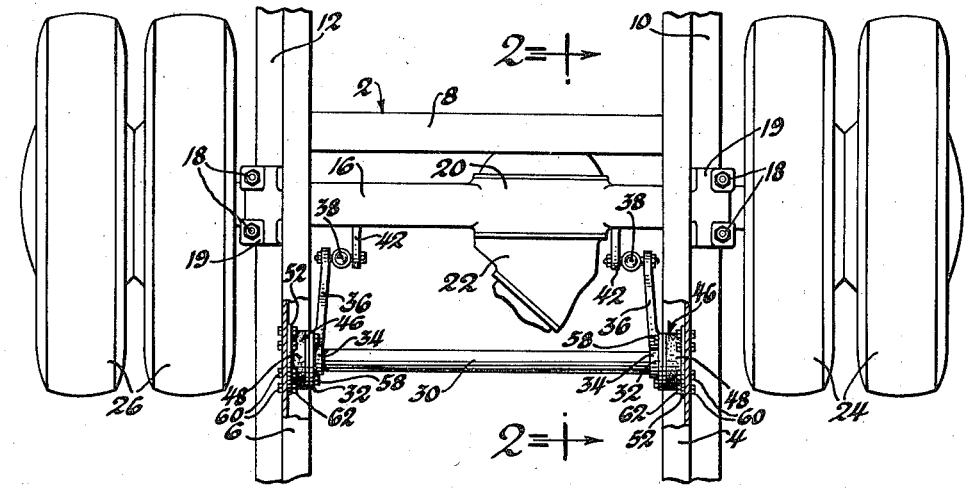
Figure 1 is a plan view of the rear end of a vehicle showing the application of the stabilizer or anti-roll device.

Referring to the drawing, the vehicle is indicated as a whole at 2 and has the frame side bars 4 and 6 suitably united by transverse members, one of which is shown at 8.

Springs 10 and 12 are secured to the frame, each spring being secured by a shackle at one end and a bracket 14 at the other. At their mid parts the springs 10 and 12 are secured to the rear axle housing 16 by means of the U bolts 18 and the cross pieces 19. The axle 16 has the differential housing 20 and the differential carrier 22 secured thereto, and on the ends of the axle 16 there are mounted the dual wheels 24 and 26. A live axle 28, inside the dead axle 16, drives the wheels 24 and 26. The parts so far described are conventional, and per se form no part of the invention.

Between the side bars 4 and 6 of the frame, a hollow tube 30 is positioned. This tube is torsionally substantially unyieldable, and comprises one element of the stabilizing mechanism or anti-roll device. At each end of the tube 30 there is mounted the plate or the disc-like part 32 having the collar 34 projecting therefrom and fitting over the tube end and welded thereto. The end of the tube 30 is preferably slightly spaced from the outer surface of the disc 32, this construction being shown at 35. For convenience of assembly and ease of positioning in the frame, the collar-like part 34 is positioned eccentrically of the disc 32. Each disc 32 has an integral arm 36 which extends rearwardly of the vehicle and has secured thereto a stud with a ball-head, the ball-head being received in a suitable pocket in an enlarged head 38 formed on a link 40 which extends downwardly toward the axle 16 and is secured to a bracket 42 rigidly secured to the axle housing 16. The link 40 also has the enlarged lower end 44 for the reception of the ball-end of a stud rigidly secured to the end of the bracket 42.

Between each plate 32 and the frame member 4 or 6, a connection 46 is provided. This connection comprises the circular block of rubber 48, the inner side plate 50 and the outer side plate 52. The rubber 48 is preferably vulcanized to the plates 50 and 52. The plate 50 has projecting therefrom the ends of short bolts 54, the heads 56 of which are imbedded in the rubber, and the plate 50 is secured to the disc 32 by means of the nuts 58.

The outer plate 52 has a greater periphery than the inner plate 50, and at the edge of the plate 52 suitable bolt holes are provided which mate with the corresponding openings in the frame side members 4 or 6. Through the mating openings the bolts 60 are passed and nuts 62 are threaded on the bolts and hold the connection 46 to the frame. From the description of the connection 46 as given, it will be seen that the rubber block 48 is positioned between the metallic plates 50 and 52 and is the means of connecting the stabilizer or anti-roll mechanism to the frame.

The rigid connection between the bar 30 and the arms 36 will render the stabilizer inherently substantially non-yieldable so that an upward movement of the wheels 24 at one side of the vehicle will produce an upward movement of the arm 36 and cause it to be moved across the vehicle by the tube 30 to the second arm 36, which will tend to produce a similar raising movement of the wheels 26 at the other side of the vehicle. This tendency and operation is well-known and tends to prevent the vehicle from rolling. Any necessary movement between the stabilizer and the frame will be taken up by the rubber 48. Because of the interposition of the rubber 48 between the stabilizer and the frame, any upward or downward movement of arm 36 from normal position will cause the rubber 48 to act as a shock absorber or snubber on vehicle spring action.

Figure 2:
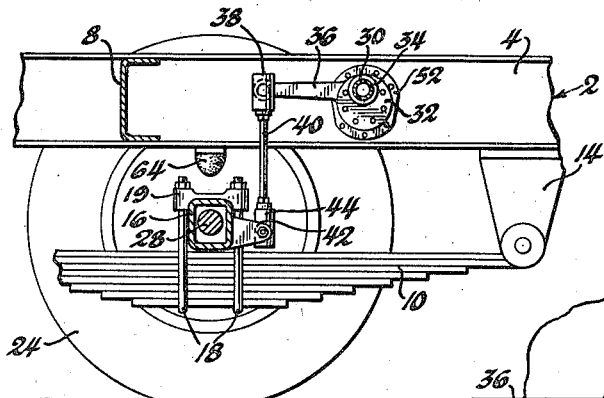
Figure 2 is a section on the line 2—2 of Figure 1.
Figure 4:
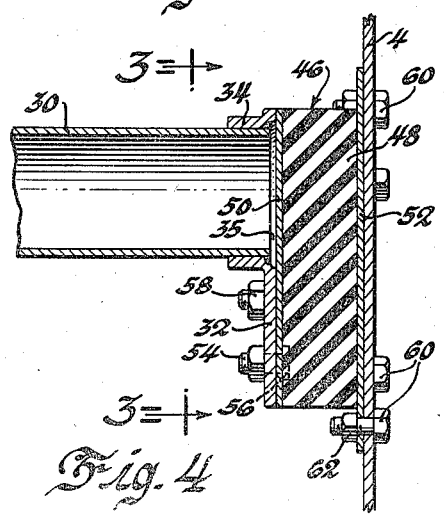
Figure 4 is an enlarged sectional detailed view taken on the line 4—4 of Figure 3.
Figure 3:
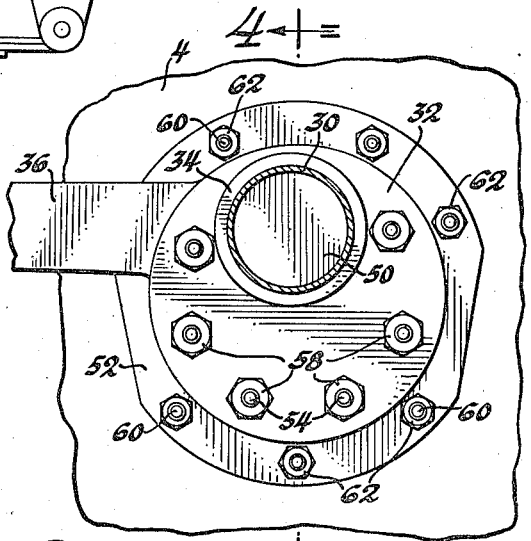
Figure 3 is an enlarged detailed view of the stabilizer on the line 3—3 of Figure 4.

In Figure 2 a rubber bumper 64 is shown. One of these bumpers is used at each side of the vehicle and is secured to the underside of the side member 4 or 6 immediately above the dead axle 16.

I claim:

1. In a stabilizing means for a vehicle having a frame, a bar extending transversely of the frame, arms rigidly secured to the ends of the bar, means to connect the ends of the arms to the vehicle axle, and means to secure the arms to the frame, said means being located at the place of connection of the arms to the bar and comprising rubber between the frame and the ends of the arms.

2. In a stabilizing means for a vehicle having a frame, a stabilizing unit mounted between the side bars of the frame, and resilient connections between the unit and the frame side bars, said connections each comprising a block of rubber secured at one side to the stabilizing means and at the other side to the frame.

3. In a stabilizing means for a vehicle having a frame, a bar extending between the side bars of the frame, two plates, one plate rigidly secured to each end of the bar, each plate having an opening in which the end of the bar is received, arms extending away from the plates, means to connect the ends of the arms to the axle of the vehicle, and means resiliently to connect the plates to the frame.

4. In a stabilizing means for a vehicle having a frame, a bar extending between the side bars of the frame, two plates, one plate rigidly secured to each end of the bar, each plate having an opening in which the end of the bar is received, arms extending away from the plates, means to connect the ends of the arms to the axle of the vehicle, two plates secured to the frame of the vehicle and spaced from the first-named plates, and a resilient connection between the plates on the stabilizer and the plates secured to the vehicle.

5. In a stabilizing means for a vehicle having a frame, a bar extending between the side bars of the frame, two plates, one plate secured to each end of the bar, means to connect the bar to the axle of the vehicle, and a rubber connection between the plates and the side bars of the frame, each connection comprising two spaced plates with a block of rubber therebetween and bonded to the plates, one of the plates of said rubber connection being secured to the frame and the other plate being secured to the plate on the end of the stabilizer bar.

DWIGHT E. AUSTIN.